United States Patent
Arechiga et al.

(10) Patent No.: US 12,062,121 B2
(45) Date of Patent: Aug. 13, 2024

(54) SYSTEM AND METHOD OF A DIGITAL PERSONA FOR EMPATHY AND UNDERSTANDING

(71) Applicant: TOYOTA RESEARCH INSTITUTE, INC., Los Altos, CA (US)

(72) Inventors: Nikos Arechiga, San Mateo, CA (US); Matthew Len Lee, Mountain View, CA (US); Charlene C. Wu, San Francisco, CA (US); Shabnam Hakimi, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/492,578

(22) Filed: Oct. 2, 2021

(65) Prior Publication Data

US 2023/0109377 A1    Apr. 6, 2023

(51) Int. Cl.
*G06T 13/40* (2011.01)
*G02B 27/01* (2006.01)
*G06F 3/01* (2006.01)
*G06N 3/045* (2023.01)

(52) U.S. Cl.
CPC .......... *G06T 13/40* (2013.01); *G02B 27/017* (2013.01); *G06F 3/011* (2013.01); *G06N 3/045* (2023.01); *G02B 2027/0134* (2013.01)

(58) Field of Classification Search
CPC .......... G06T 13/40; G02B 27/017; G02B 2027/0134; G06F 3/011; G06N 3/0454
See application file for complete search history.

(56) References Cited

U.S. PATENT DOCUMENTS 10,943,407 B1* 3/2021 Morgan ................ G16H 10/60
2009/0044113 A1* 2/2009 Jones ..................... G06T 13/40
715/707

(Continued)

FOREIGN PATENT DOCUMENTS

| CN | 109800730 A | 5/2019 |
| CN | 111432267 A | 7/2020 |
| WO | 2020260869 A1 | 12/2020 |

OTHER PUBLICATIONS

Lisetti, Christine, et al. "I can help you change! an empathic virtual agent delivers behavior change health interventions." ACM Transactions on Management Information Systems (TMIS) 4.4 (2013): 1-28.*

(Continued)

*Primary Examiner* — Sarah Lhymn
(74) *Attorney, Agent, or Firm* — SEYFARTH SHAW LLP

(57) ABSTRACT

A method to generate a digital avatar simulating a human for behavioral empathy and understanding is described. The method includes training a neural network to generate the digital avatar to simulate the human according to a vector of human attributes and generate responses in response to interactions with a user based on the vector of human attributes. The method also includes interacting, by the user, with the digital avatar, in which the digital avatar initially having a similar background and attributes as the user. The method further includes modifying, over time, the attributes of the digital avatar to represent a target background and a target set of attributes different from the user.

18 Claims, 6 Drawing Sheets

(56) References Cited

U.S. PATENT DOCUMENTS

| | | | | |
|---|---|---|---|---|
| 2010/0306712 | A1* | 12/2010 | Snook | G06F 3/017 |
| | | | | 715/863 |
| 2013/0121591 | A1* | 5/2013 | Hill | G10L 15/1815 |
| | | | | 382/195 |
| 2013/0218687 | A1* | 8/2013 | Sohangir | G06Q 30/0241 |
| | | | | 705/14.66 |
| 2015/0143209 | A1* | 5/2015 | Sudai | G06F 40/186 |
| | | | | 715/202 |
| 2017/0206797 | A1* | 7/2017 | Solomon | G06N 3/006 |
| 2017/0364508 | A1* | 12/2017 | Abrahams | G06N 5/022 |
| 2018/0260387 | A1* | 9/2018 | Ben-Kiki | G06F 40/30 |
| 2019/0027052 | A1* | 1/2019 | Moore | G09B 19/00 |
| 2019/0043239 | A1 | 2/2019 | Goel et al. | |
| 2019/0122411 | A1 | 4/2019 | Sachs et al. | |
| 2019/0354261 | A1 | 11/2019 | Zhao et al. | |
| 2020/0051303 | A1* | 2/2020 | Li | G06T 13/40 |
| 2020/0213680 | A1* | 7/2020 | Ingel | G10L 13/00 |
| 2021/0027511 | A1* | 1/2021 | Shang | G06N 3/088 |
| 2021/0035047 | A1* | 2/2021 | Mossoba | G06Q 10/1053 |
| 2021/0043099 | A1 | 2/2021 | Du et al. | |
| 2021/0217532 | A1* | 7/2021 | Heimerl | A61B 5/026 |
| 2021/0272682 | A1* | 9/2021 | Hebrard | G16H 30/00 |
| 2021/0350202 | A1* | 11/2021 | Zachariah | G06F 21/6254 |
| 2022/0005246 | A1* | 1/2022 | Nadimpalli | G10L 25/90 |
| 2022/0028366 | A1* | 1/2022 | Kephart | G06T 13/205 |
| 2022/0068296 | A1* | 3/2022 | Wilson | G06N 3/049 |
| 2022/0130077 | A1* | 4/2022 | Rajarathnam | G10L 25/51 |
| 2022/0138455 | A1* | 5/2022 | Nagano | G06V 10/764 |
| | | | | 382/118 |
| 2022/0138995 | A1* | 5/2022 | Baughman | G06Q 30/0201 |
| | | | | 345/619 |
| 2022/0155850 | A1* | 5/2022 | Kodeih | G09B 19/00 |
| 2022/0222892 | A1* | 7/2022 | Luo | G06V 40/168 |
| 2022/0253126 | A1* | 8/2022 | Holland | G06F 3/011 |
| 2022/0254188 | A1* | 8/2022 | Vaggalis | G06V 40/171 |

OTHER PUBLICATIONS

Brown, D. E., Moenning, A., Guerlain, S., Turnbull, B., Abel, D., & Meyer, C. (2019). Design and evaluation of an avatar-based cultural training system. The Journal of Defense Modeling and Simulation, 16(2), 159-174.*

Hoang, et al., "Using virtual reality could make you a better person in real life" (https://theconversation.com/using-virtual-reality-could-make-you-a-betterperson-in-real-life-119301), Jul. 3, 2019.

* cited by examiner

SYSTEM AND METHOD OF A DIGITAL PERSONA FOR EMPATHY AND UNDERSTANDING

BACKGROUND

Field

Certain aspects of the present disclosure generally relate to machine learning and, more particularly, to a system and method for a digital persona to provide empathy and understanding to a user.

Background

As indicated by the recent census, the United States is becoming more diverse. Unfortunately, many people experience difficulty relating to and communicating with people of different backgrounds, cultures, and personalities. The following examples are circumstances in which humans struggle to understand each other, such as: (1) cross-cultural interactions in diverse organizations; (2) interactions between people of different political beliefs, in which echo chambers and polarization have led people of different groups to believe they have nothing in common with people of other groups; and/or (3) interactions in which one person makes a decision having an impact on another person, but without a sufficient good understanding of the lived experience of the affected person and how the decision may affect the person. For example, Person A has difficulty understanding or relating to people from Group B. People in group B may have a different background from Person A, such as being of a different age, a different gender, and/or a different educational background.

From behavioral science, it is recognized that people find it easier to relate to people that are more similar. A system and method that allows a human user to interact in virtual reality with a digital simulation of another person, possibly hypothetical or real, is desired. In particular, a digital avatar that is modified to produce behavioral characteristics of humans from different backgrounds, for example different ages, races, gender, incomes, education levels, etc., is desired.

SUMMARY

A method to generate a digital avatar simulating a human for behavioral empathy and understanding is described. The method includes training a neural network to generate the digital avatar to simulate the human according to a vector of human attributes and generate responses in response to interactions with a user based on the vector of human attributes. The method also includes interacting, by the user, with the digital avatar, in which the digital avatar initially having a similar background and attributes as the user. The method further includes modifying, over time, the attributes of the digital avatar to represent a target background and a target set of attributes different from the user.

A non-transitory computer-readable medium having program code recorded thereon to generate a digital avatar simulating a human for behavioral empathy and understanding is described. The program code is executed by a processor. The non-transitory computer-readable medium includes program code to train a neural network to generate the digital avatar to simulate the human according to a vector of human attributes and generate responses in response to interactions with a user based on the vector of human attributes. The non-transitory computer-readable medium also includes program code to interact, by the user, with the digital avatar, in which the digital avatar initially having a similar background and attributes as the user. The non-transitory computer-readable medium further includes program code to modify, over time, the attributes of the digital avatar to represent a target background and a target set of attributes different from the user.

A system to generate a digital avatar simulating a human for behavioral empathy and understanding is described. The system includes digital avatar training networks to train a neural network to generate the digital avatar to simulate the human according to a vector of human attributes and generate responses in response to interactions with a user based on the vector of human attributes. The system also includes a digital avatar interaction module to interact, by the user, with the digital avatar, in which the digital avatar initially having a similar background and attributes as the user. The system further includes a digital avatar modification module to modify, over time, the attributes of the digital avatar to represent a target background and a target set of attributes different from the user.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
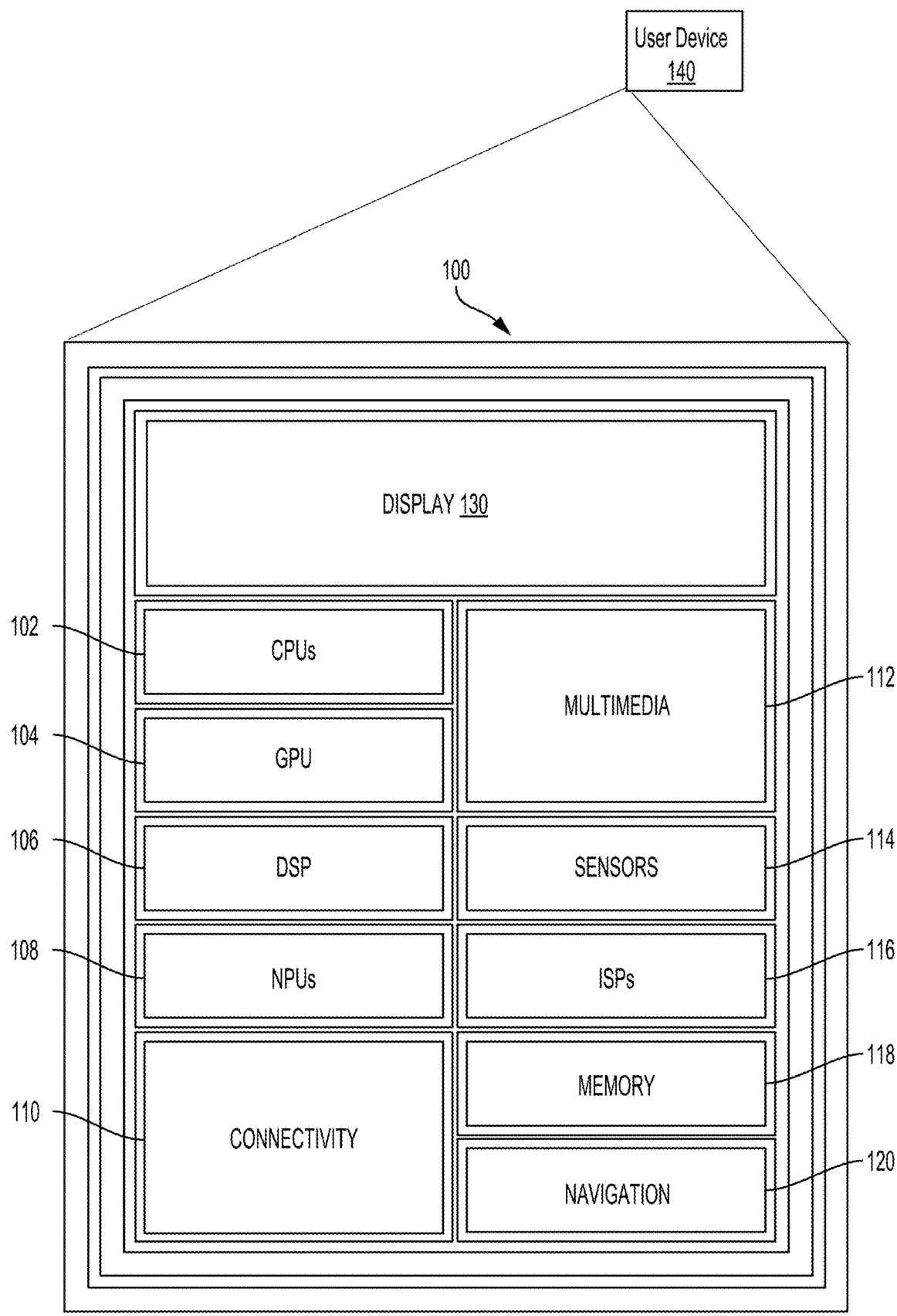
FIG. 1 illustrates an example implementation of designing a neural network using a system-on-a-chip (SOC) of a digital persona for a behavioral empathy and understanding system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

As indicated by the recent census, the United States is becoming more diverse. Unfortunately, many people experience difficulty relating to and communicating with people of different backgrounds, cultures, and personalities. The following examples are circumstances in which humans struggle to understand each other, such as: (1) cross-cultural interactions in diverse organizations; (2) interactions between people of different political beliefs, in which echo chambers and polarization have led people of different groups to believe they have nothing in common with people of other groups; and/or (3) interactions in which one person makes a decision having an impact on another person, but without a sufficient good understanding of the lived experience of the affected person and how the decision may affect the person. For example, Person A has difficulty understanding or relating to people from Group B. People in group B may have a different background from Person A, such as being of a different age, a different gender, and/or a different educational background.

From behavioral science, it is recognized that people find it easier to relate to people that are more similar. As a result, a system and method that allows a human user to interact in virtual reality with a digital simulation of another person, possibly hypothetical or real, is desired. Aspects of the present disclosure are directed to a system that allows a user to interact in virtual reality with an avatar representing a digital simulation of another person. The digital avatar can be modified to produce behavioral characteristics of humans from different backgrounds. In some aspects of the present disclosure, the system trains a machine learning model with a generator neural network and a discriminator neural network. In these aspects of the present disclosure, the generator neural network receives a vector of avatar attributes (e.g., age, race, gender, etc.) as input.

In aspects of the present disclosure, a digital avatar is modified to produce behavioral characteristics of humans from different backgrounds, for example different ages, races, gender, incomes, education levels, etc. At each step of interaction with the user, the generator neural network considers the actions of the user and generates a response to be performed by the avatar, including speech, facial expressions, and body language. In these aspects of the present disclosure, the discriminator neural network receives the actions of the user and the reactions of the generator neural network as input. The discriminator neural network then determines whether the actions of the digital avatar are realistic and provides feedback to the generator neural network. In this configuration, both the generator neural network and the discriminator neural network are trained from real interactions with humans from different backgrounds. Accordingly, the neural networks can learn to convincingly reproduce realistic behavior.

In operation, the system initially generates a digital avatar that has similar attributes to the user. The user can then interact with the digital avatar. Because the avatar initially has similar attributes to the user, the user should be comfortable interacting with the avatar. Over time, as the user interacts with the digital avatar, the attributes of the avatar are modified to be less similar to the user and more similar to a target background selected by the user. The target background may be a background of an individual that the user wishes to interact with more comfortably. By gradually modifying the attributes of the digital avatar to become less similar to the user and more similar to the target background, the user gradually becomes more comfortable interacting with the target background to gain behavioral empathy and understanding regarding the target background.

FIG. 1 illustrates an example implementation of the aforementioned system and method for a digital avatar of a behavioral empathy and understanding system using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., CPU 102) or the NPU 108 of the user device 140 may include code to generate an avatar simulating a human. The instructions loaded into a processor (e.g., CPU 102) may also include code to train a neural network to generate the avatar to simulate the human according to a vector of human attributes and generate responses in response to interactions with a user based on the vector of human attributes. The instructions loaded into a processor (e.g., CPU 102) may also include code to interact, by the user, with the avatar, in which the avatar initially has a similar background and attributes as the user. The instructions loaded into a processor (e.g., CPU 102) may also include code to modify, over time, the attributes of the avatar to represent a target background and a target set of attributes different from the user.

Figure 2:
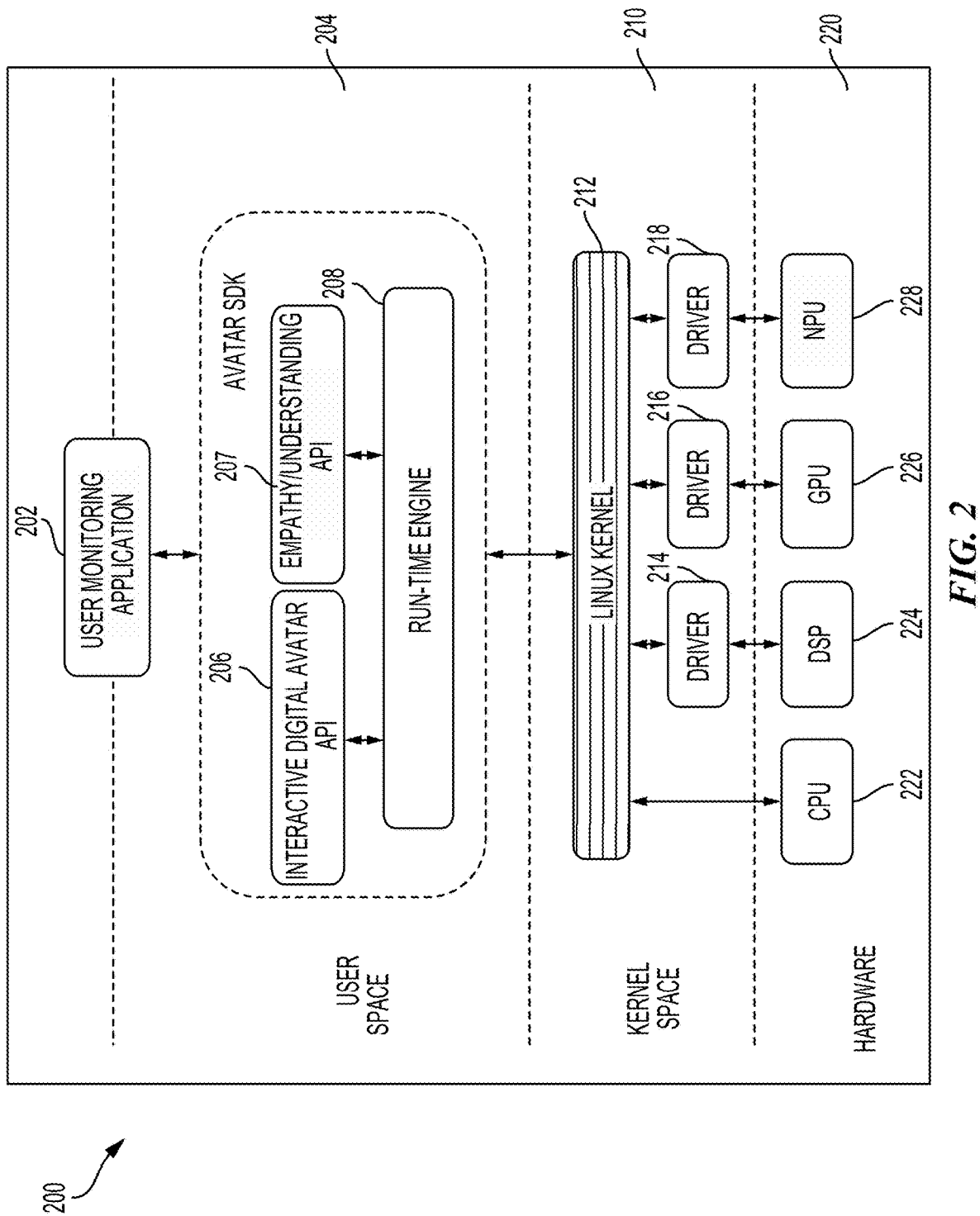
FIG. 2 is a block diagram illustrating an exemplary software architecture that may modularize artificial intelligence (AI) functions of a digital persona for a behavioral empathy and understanding system, according to aspects of the present disclosure.

FIG. 2 is a block diagram illustrating a software architecture 200 that may modularize artificial intelligence (AI) functions for a digital avatar of a behavioral empathy and understanding system, according to aspects of the present disclosure. Using the architecture, a user monitoring application 202 may be designed such that it may cause various processing blocks of a system-on-a-chip (SOC) 220 (for example a CPU 222, a DSP 224, a GPU 226, and/or an NPU 228) to perform supporting computations during run-time operation of the user monitoring application 202. FIG. 2 describes the software architecture 200 for the behavioral empathy and understanding system, it should be recognized that the behavioral empathy and understanding system is not limited to different cultures. According to aspects of the present disclosure, the behavioral empathy and understanding functionality is applicable to any type of user activity between different individuals, such as the young and the older generations.

The user monitoring application 202 may be configured to call functions defined in a user space 204 that may, for example, provide for behavioral empathy and understanding services using a digital avatar. The user monitoring application 202 may make a request for compiled program code associated with a library defined in an interactive digital avatar data application programming interface (API) 206. The interactive digital avatar API 206 is configured to train a neural network to generate the digital avatar to simulate the human according to a vector of human attributes and generate responses in response to interactions with a user based on the vector of human attributes. In addition, the compiled program code of the interactive digital avatar API 206 is configured to enable the user to interact with the digital avatar, in which the digital avatar initially has a similar background and attributes as the user. In response, the compiled program code of an empathy/understanding API 207 is configured to modify, over time, the attributes of the digital avatar to represent a target background and a target set of attributes different from the user for providing the user with empathy for the target background different than the user.

A run-time engine 208, which may be compiled code of a run-time framework, may be further accessible to the user monitoring application 202. The user monitoring application 202 may cause the run-time engine 208, for example, to take actions for providing periodically modifying the digital avatar presented to the user until the attributes of the digital avatar match the target background. In response to interaction with the digital avatar, the run-time engine 208 may in turn send a signal to an operating system 210, such as a Linux Kernel 212, running on the SOC 220. FIG. 2 illustrates the Linux Kernel 212 as software architecture for behavioral empathy/understanding of a target background using the digital avatar. It should be recognized, however, that aspects of the present disclosure are not limited to this exemplary software architecture. For example, other kernels may provide the software architecture to support the behavioral empathy and understanding functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

From behavioral science, it is recognized that people find it easier to relate to people that are more similar. As a result, a system and method that allows a human user to interact in virtual reality with a digital simulation of another person, possibly hypothetical or real, is desired. Aspects of the present disclosure are directed to a system that allows a user to interact in virtual reality with an avatar representing a digital simulation of another person. The digital avatar can be modified to produce behavioral characteristics of humans from different backgrounds. In some aspects of the present disclosure, the system trains a machine learning model with a generator neural network and a discriminator neural network. In these aspects of the present disclosure, the generator neural network receives a vector of avatar attributes (e.g., age, race, gender, etc.) as input.

In aspects of the present disclosure, a digital avatar is modified to produce behavioral characteristics of humans from different backgrounds, for example different ages, races, gender, incomes, education levels, etc. At each step of interaction with the user, the generator neural network considers the actions of the user and generates a response to be performed by the avatar, including speech, facial expressions, and body language. In these aspects of the present disclosure, the discriminator neural network receives the actions of the user and the reactions of the generator neural network as input. The discriminator neural network then determines whether the actions of the digital avatar are realistic and provides feedback to the generator neural network. In this configuration, both the generator neural network and the discriminator neural network are trained from real interactions with humans from different backgrounds. Accordingly, the neural networks can learn to convincingly reproduce realistic behavior.

In operation, the system initially generates a digital avatar that has similar attributes to the user. The user can then interact with the avatar. Because the digital avatar initially has similar attributes to the user, the user should be comfortable interacting with the avatar. Over time, as the user interacts with the digital avatar, the attributes of the digital avatar are modified to be less similar to the user and more similar to a target background selected by the user. The target background may be a background of an individual that the user wishes to be more comfortable interacting with. By gradually modifying the attributes of the avatar to become less similar to the user and more similar to the target background, the user gradually becomes more comfortable interacting with the target background to gain behavioral empathy and understanding regarding the target background.

Figure 3:
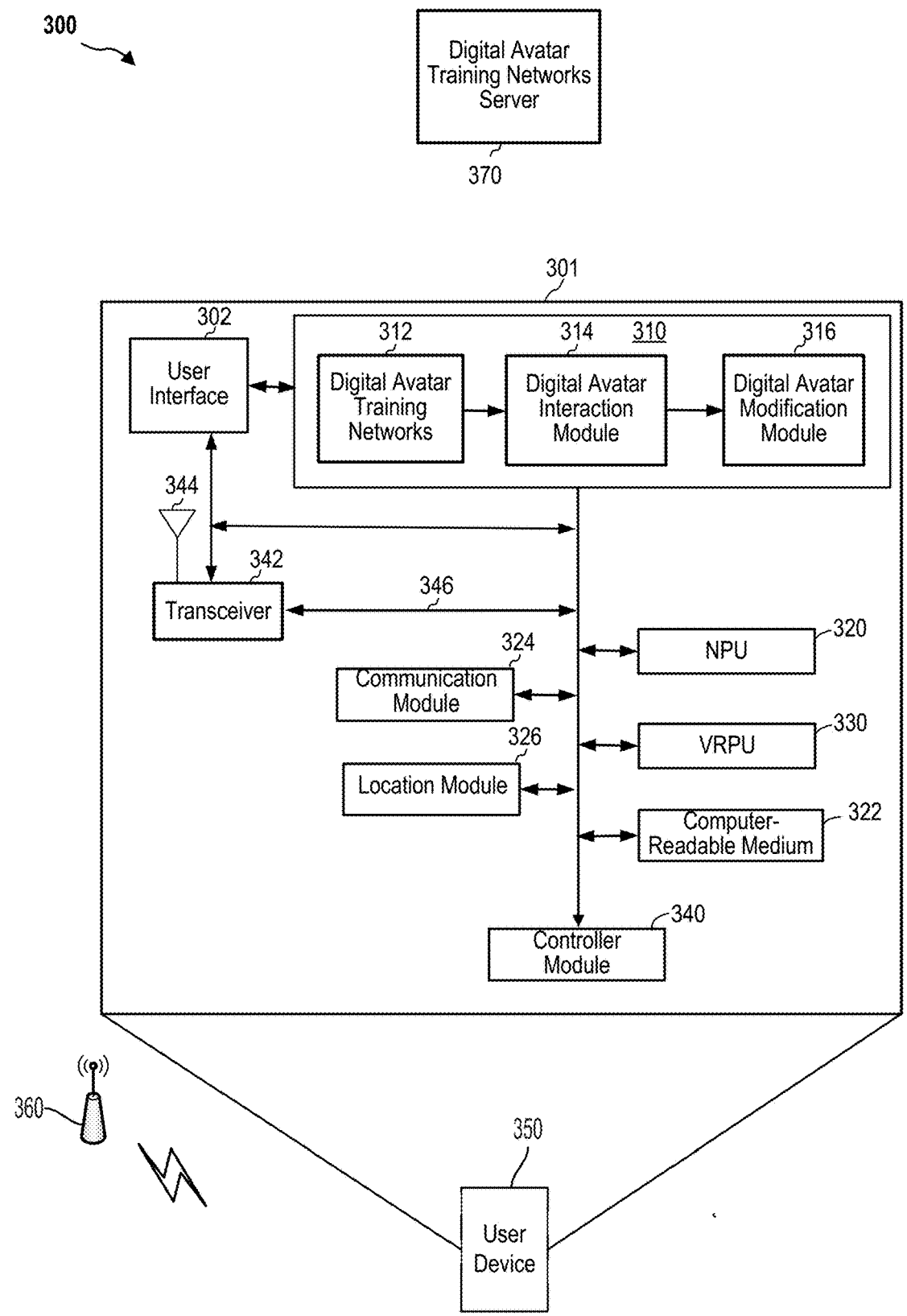
FIG. 3 is a diagram illustrating a hardware implementation of a digital persona for a behavioral empathy and understanding system, according to aspects of the present disclosure.

FIG. 3 is a diagram illustrating a hardware implementation for a behavioral empathy and understanding system 300, according to aspects of the present disclosure. The behavioral empathy and understanding system 300 may be configured to generate an avatar simulating a human presented to a user to provide behavioral empathy and understanding regarding different backgrounds. The behavioral empathy and understanding system 300 is also configured to train a neural network to generate the digital avatar to simulate the human according to a vector of human attributes and generate responses in response to interactions with a user based on the vector of human attributes. In addition, the behavioral empathy and understanding system 300 is configured to enable the user to interact with the digital avatar, in which the digital avatar initially has a similar background and attributes as the user. In response, the behavioral empathy and understanding system 300 is also configured to modify, over time, the attributes of the digital avatar to represent a target background and a target set of attributes different from the user for providing the user with empathy for the target background different than the user.

The behavioral empathy and understanding system 300 includes a user monitoring system 301 and a digital avatar training networks server 370 in this aspect of the present disclosure. The user monitoring system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The digital avatar training networks server 370 may connect to the user device 350 for generating an avatar simulating a human presented to the user for enabling the user to gain empathy and understanding regarding a different background. For example, the digital avatar training networks server 370 may train a neural network to generate the digital avatar to simulate the human according to a vector of human attributes and generate responses in response to interactions with a user based on the vector of human attributes. In response, the digital avatar training networks server 370 is configured to enable the user to interact with the digital avatar, in which the digital avatar initially has a similar background and attributes as the user. In addition, the digital avatar training networks server 370 is configured to modify, over time, the attributes of the digital avatar to represent a target background and a target set of attributes, different from the user, for providing the user with empathy for the target background different than the user.

The user monitoring system 301 may be implemented with an interconnected architecture, represented generally by an interconnect 346. The interconnect 346 may include any number of point-to-point interconnects, buses, and/or bridges depending on the specific application of the user monitoring system 301 and the overall design constraints. The interconnect 346 links together various circuits including one or more processors and/or hardware modules, represented by a user interface 302, a user activity module 310, a neutral network processor (NPU) 320, a computer-readable medium 322, a communication module 324, a location module 326, a virtual reality (VR) processing unit (VRPU) 330, and a controller module 340. The interconnect 346 may also link various other circuits such as timing sources, peripherals, voltage regulators, and power management circuits, which are well known in the art, and therefore, will not be described any further.

The user monitoring system 301 includes a transceiver 342 coupled to the user interface 302, the user activity module 310, the NPU 320, the computer-readable medium 322, the communication module 324, the location module 326, the VRPU 330, and the controller module 340. The transceiver 342 is coupled to an antenna 344. The transceiver 342 communicates with various other devices over a transmission medium. For example, the transceiver 342 may receive commands via transmissions from a user or a connected vehicle. In this example, the transceiver 342 may receive/transmit information for the user activity module 310 to/from connected devices within the vicinity of the user device 350.

The user monitoring system 301 includes the NPU 320 coupled to the computer-readable medium 322. The NPU 320 performs processing, including the execution of software stored on the computer-readable medium 322 to provide a neural network model for user monitoring and advice recommendation functionality according to the present disclosure. The software, when executed by the NPU 320, causes the user monitoring system 301 to perform the various functions described for presenting a gradually modified digital avatar to the user through the user device 350, or any of the modules (e.g., 310, 324, 326, 330, and/or 340). The computer-readable medium 322 may also be used for storing data that is manipulated by the VRPU 330 when executing the software to analyze user communications.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the autonomous vehicle 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the user monitoring system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The user monitoring system 301 also includes the VRPU 330 to present the digital avatar to the user in virtual reality. From behavioral science, it is recognized that people find it easier to relate to people that are more similar. As a result, the user monitoring system 301 may allow a human user to interact in virtual reality with a digital simulation of another person, possibly hypothetical or real, using the VRPU 330. In these aspects of the present disclosure, the user activity module 310, in conjunction with the VRPU 330, allows a user to interact with a digital avatar representing a digital simulation of another person in virtual reality. The digital avatar can be modified to produce behavioral characteristics of humans from different backgrounds. In some aspects of the present disclosure, a component of the user activity module 310 trains a machine learning model with a generator neural network and a discriminator neural network.

The user activity module 310 may be in communication with the user interface 302, the NPU 320, the computer-readable medium 322, the communication module 324, the location module 326, the VRPU 330, the controller module 340, and the transceiver 342. In one configuration, the user activity module 310 monitors communications from the user interface 302. The user interface 302 may monitor user communications to and from the communication module 324. According to aspects of the present disclosure, the VRPU 330 may use computer vision techniques to find the boundaries of the graphical object and subsequently decompose the object into its components. For example, the graphical components may include individual data points, lines, bars, or color areas (e.g., in the case of heat maps).

As shown in FIG. 3, the user activity module 310 includes digital avatar training networks 312, a digital avatar interaction module 314, and a digital avatar modification module 316. The digital avatar training networks 312, the digital avatar interaction module 314, and the digital avatar modification module 316 may be components of a same or different artificial neural network, such as a generative adversarial network (GAN). In some aspects of the present disclosure, a controllable GAN framework of the digital avatar training networks 312 includes two neural networks. The first is referred to as a generator neural network, and the second is referred to as a discriminator neural network. The digital avatar training networks 312 are not limited to the controllable GAN framework and may be implemented using a variational auto encoder (VAE) to provide the virtual, digital avatar.

In this aspect of the present disclosure, the generator neural network is provided with an input vector of features (a specific choice of age, race, gender, etc.). At each interaction time, the generator neural network also considers the actions of the user, and generates a response, consisting of speech, facial expressions, and body language. The second neural network (e.g., the discriminator neural network) receives as input of the user actions and the reactions of the generator neural network, and determines whether the actions of the digital avatar produced by the generator neural network are realistic. This determination from the discriminator neural network is provided as feedback to the generator neural network. Both the generator and the discriminator neural networks are trained from real interactions with humans from different backgrounds. In this way, the generator neural network learns to convincingly produce realistic behaviors. Other sources of behavioral variations based on user characteristics can include: large scale marketing surveys, purchase histories, or ad consumption.

This configuration of the user activity module 310 includes the digital avatar training networks 312 configured to train a neural network to generate a digital avatar to simulate a human according to a vector of human attributes and generate responses in response to interactions with a user based on the vector of human attributes. In addition, the user activity module 310 includes the digital avatar interaction module 314 configured to enable the user to interact with the digital avatar, in which the digital avatar initially has a similar background and attributes as the user. In addition, the user activity module 310 includes the digital avatar modification module 316 configured to modify, over time, the attributes of the digital avatar to represent a target background and a target set of attributes different from the user for providing the user with empathy for the target background different than the user. In some aspects of the present disclosure, the digital avatar training networks 312 may be implemented and/or work in conjunction with the the digital avatar training networks server 370, for example, as shown in FIG. 4.

Figure 4:
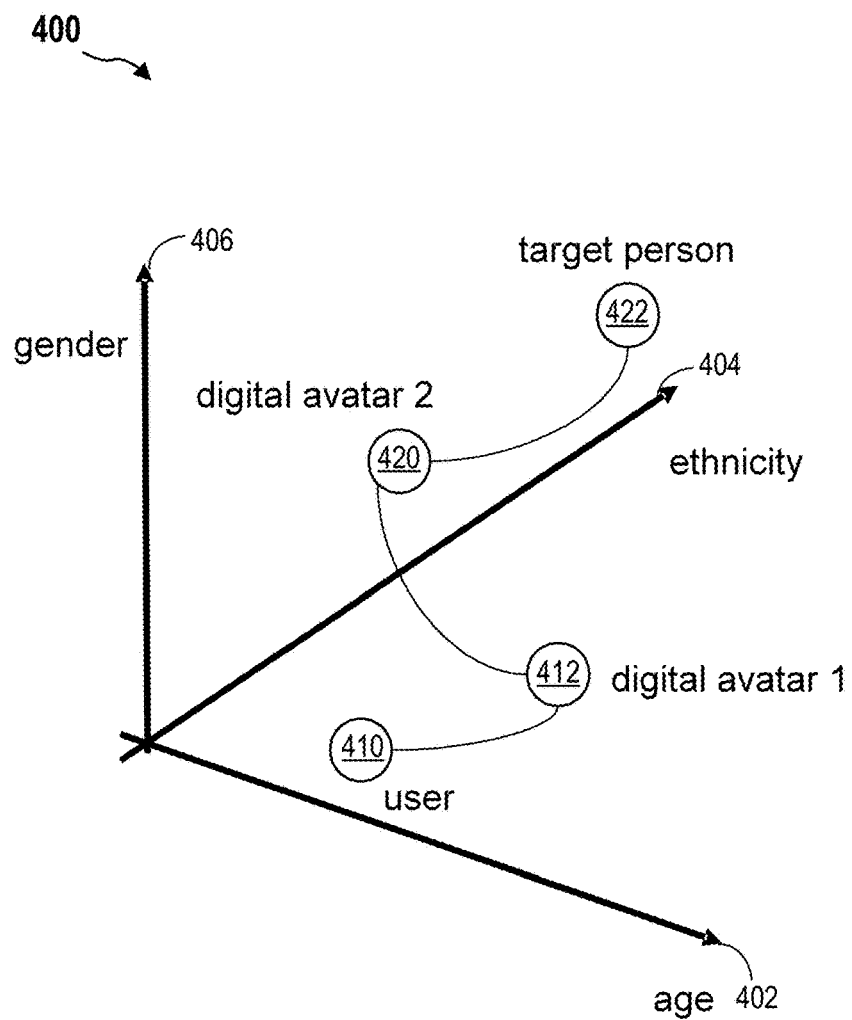
FIG. 4 is a block diagram illustrating digital avatars of a behavioral empathy and understanding system, in accordance with aspects of the present disclosure.

FIG. 4 is a graph 400 illustrating gradual modifications of digital avatars of a behavioral empathy and understanding system, in accordance with aspects of the present disclosure. Some aspects of the present disclosure allow a user 410 (e.g., a human user) to interact in virtual reality with a digital simulation of another person, referred to as a digital avatar. As shown in the graph 400 of FIG. 4, a first digital avatar can be modified to produce behavioral characteristics of humans from different backgrounds to form a second digital avatar 420 of a target person 422. For example, the behavioral characteristics of humans from different backgrounds may include different ages, races, gender, incomes, education levels, etc. In this example, the graph 400 is a three-dimensional (3D) graph including age as an X-axis 402, ethnicity as a Y-axis 404, and gender as a Z-axis 406.

As shown in the graph 400 of FIG. 4, gradually modifying the attributes of the first digital avatar 412 over time to form the second digital avatar 420 representing the target person 422, different from the user 410, enables the user 410 to gain empathy and understanding of the target person 422. For example, suppose Person A has difficulty understanding or relating to people from Group B. In this example, people in group B differ in background from Person A in a number of different ways, such as being a different age, being a different gender, and having a different educational background. Some aspects of the present disclosure are directed to improving empathy of Person A to people of Group B.

Behavioral science recognizes that people find it easier relating to people that are more similar to themselves. Some aspects of the present disclosure begin by generating an interactive avatar that is similar to Person A, but with a small change in psychological distance by modifying one characteristic. For example, as shown in FIG. 4, the first digital avatar 412 is generated with characteristics similar to the user 410, but with a different ethnicity. Then, Person A would talk to the digital avatar and gain rapport, building common understanding and empathy. Then, these aspects of the present disclosure make another edit to the digital avatar, for example, a gender to form the second digital avatar 420. Progressively, these aspects of the present disclosure make small changes to the digital avatar that slowly increase the psychological distance in the direction of the target person 422 (e.g., Group B), until the user 410 (e.g., Person A) feels that they have some empathy and understanding of people similar to the target person 422 (e.g., people of Group B).

As shown in FIG. 4, operation of the behavioral empathy and understanding system begins by characterizing the user 410 across a set of demographic dimensions, for example: age, race, gender, income, education level, political views, etc. Next, a profile of the target person 422 with whom the user wants to build greater shared understanding is identified. For example, the target person 422 may be a work colleague from a very different cultural background, an extended family member, or other person. The behavioral empathy and understanding system interfaces the user 410 with the first digital avatar 412 and the second digital avatar 420 that are increasingly more different from the user 410 and increasingly similar to the target person 422. Although the graph 400 of FIG. 4 illustrates the first digital avatar 412 and the second digital avatar 420, aspects of the present disclosure completed an increased number of digital avatars depending on a degree of differences between the user 410 and the target person 422.

Figure 5:
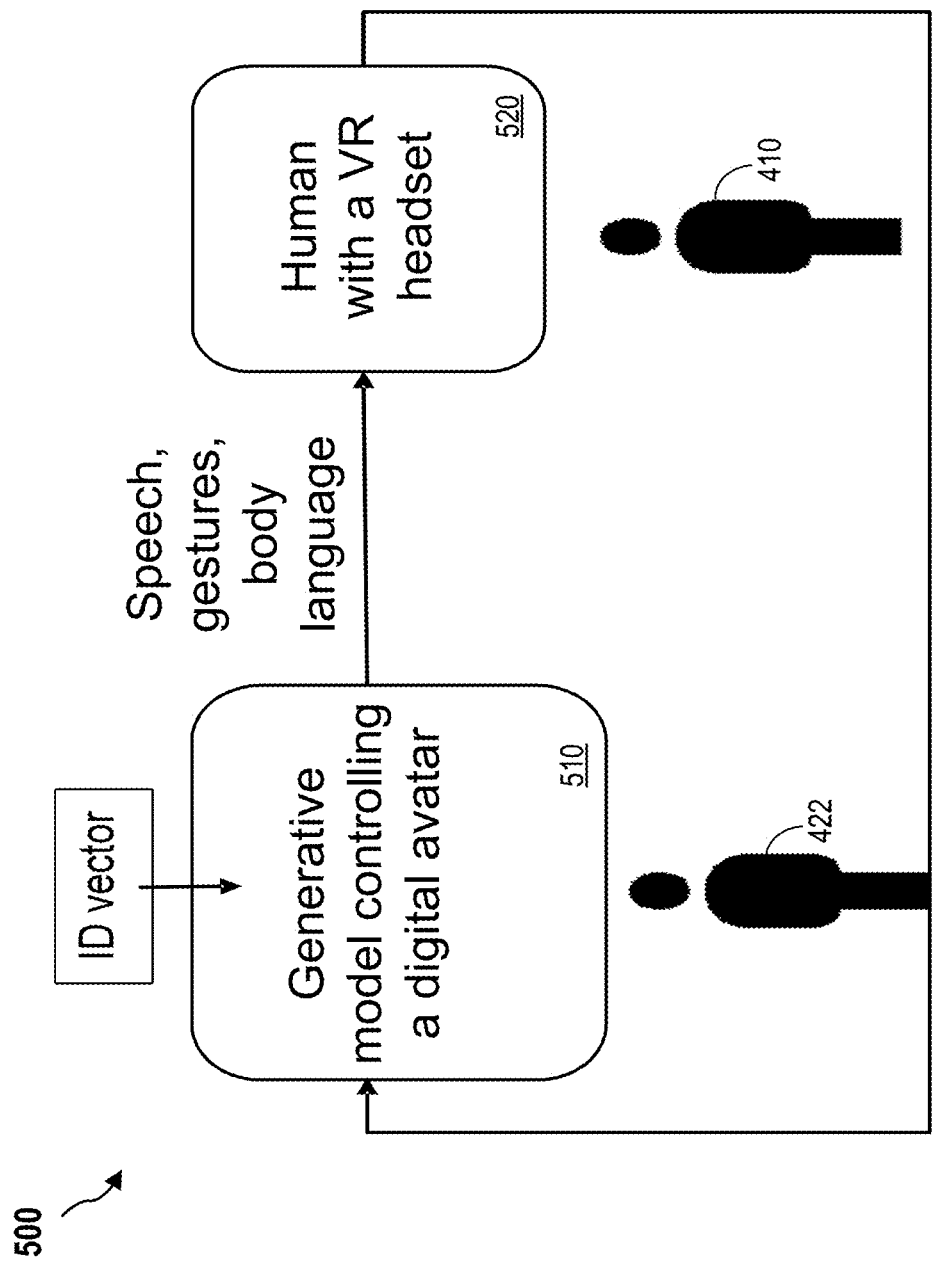
FIG. 5 is a block diagram illustrating a behavioral empathy and understanding system, in accordance with aspects of the present disclosure.

FIG. 5 is a block diagram illustrating an interaction method of a behavioral empathy and understanding system, in accordance with aspects of the present disclosure. A method 500 begins at block 510, in which an identification vector (ID) is provided as input to a generative model controlling a digital avatar. In this example, the behavioral empathy and understanding system trains a generative machine learning (ML) model to produce an interactive, digital avatar. For example, the digital avatar may be as simple as a chatbot, and as immersive and complex as a virtual reality digital avatar. In some aspects of the present disclosure, producing the digital avatar is accomplished using a controllable GAN framework. For example, as shown in FIG. 3, the digital avatar training networks 312 include two neural networks. The first network is referred to as a generator neural network and the second is referred to as a discriminator neural network. The digital avatar training networks 312 are not limited to the controllable GAN framework and may be implemented using a variational auto encoder (VAE) to provide the virtual, digital avatar.

At block 520, the user 410 interacts with the digital avatar using a virtual reality (VR) headset, which may be provided using a digital avatar display module. In this configuration of the method 500, a generator of the controllable GAN framework produces a reactive avatar, and the behaviors of the digital avatar are features that distinguish humans of different backgrounds. The generated responses including but not limited to speech, facial expressions, body language, opinions, and preferences can be embodied in various user interfaces such as a text/voice chatbot or visual, digital avatar. The chatbot or digital avatar may be animated according to a set script (resulting in a monologue recording or a video of the avatar speaking/moving). Alternatively, the chatbot or digital avatar is interactive, in which the user 410 may ask questions about their background, experiences, opinions, values, and how they might react to a product or idea. In this example, FIG. 5 illustrates displaying the digital avatar to the user through a virtual reality headset.

In this aspect of the present disclosure, the generative ML model is provided with an input ID vector of features (e.g., a specific choice of age, race, gender, etc.). At each interaction time, the generative ML model also considers the actions of the user, and generates a response, consisting of speech, facial expressions, and body language. A second neural network (e.g., the discriminator neural network) of the controllable GAN framework receives as input of the user actions and the reactions of the generator neural network, and determines whether the actions of the digital avatar produced by the generator neural network are realistic. This determination from the discriminator neural network is provided as feedback to the generator neural network.

FIG. 5 demonstrates how the user 410 is led to interact with people who are progressively more different from themselves, and more similar to the target person 422 with whom the user wants to gain insight. In this configuration of the controllable GAN framework, both the generator and the discriminator neural networks are trained from real interactions with humans from different backgrounds. The generated responses including but not limited to speech, facial expressions, body language, opinions, and preferences can be embodied in various user interfaces. In this way, the generator neural network learns to convincingly produce realistic behaviors. Other sources of behavioral variations based on user characteristics can include: large scale marketing surveys, purchase histories, or ad consumption. A behavioral empathy and understanding system may engage in a process, for example, as shown in FIG. 6.

Figure 6:
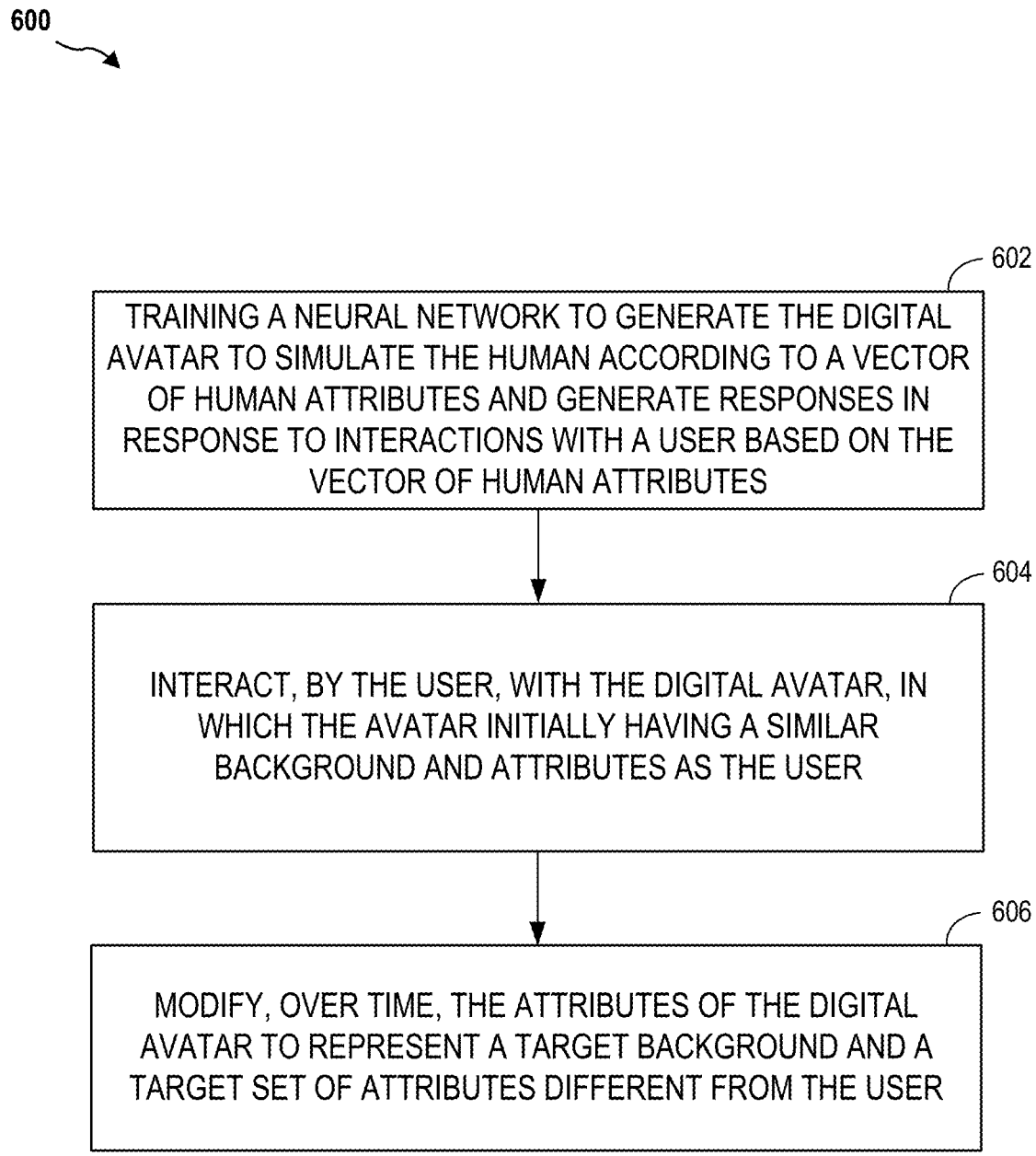
FIG. 6 is a flowchart illustrating a method for behavioral empathy and understanding, according to aspects of the present disclosure.

FIG. 6 is a flowchart illustrating a method to generate a digital avatar simulating a human for behavioral empathy and understanding, according to aspects of the present disclosure. A method 600 of FIG. 6 begins at block 602, in which a neural network is trained to generate the digital avatar to simulate the human according to a vector of human attributes and generate responses in response to interactions with a user based on the vector of human attributes. For example, as described in FIG. 5, a behavioral empathy and understanding system trains a generative machine learning (ML) model to produce an interactive, digital avatar. For example, the digital avatar may be as simple as a chatbot, and as immersive and complex as a virtual reality digital avatar. In some aspects of the present disclosure, the digital avatar is implemented using a controllable GAN framework. For example, as shown in FIG. 3, the digital avatar training networks 312 include two neural networks. The first network is referred to as a generator neural network and the second is referred to as a discriminator neural network. The digital avatar training networks 312 are not limited to the controllable GAN framework and may be implemented using a variational auto encoder (VAE) to provide the virtual, digital avatar.

Referring again to FIG. 6, at block 604, the user interacts with the digital avatar, in which the avatar initially having a similar background and attributes as the user. For example, as shown in FIG. 5, at block 520, the user 410 interacts with the digital avatar using a virtual reality (VR) headset. In this configuration of the method 500, a generator of the controllable GAN framework produces a reactive avatar, and the behaviors of the digital avatar are features that distinguish humans of different backgrounds. The generated responses including but not limited to speech, facial expressions, body language, opinions, and preferences can be embodied in various user interfaces such as a text/voice chatbot or visual, digital avatar.

At block 606, the attributes of the digital avatar are modified, over time, to represent a target background and a target set of attributes different from the user. For example, as shown in FIG. 4, operation of the behavioral empathy and understanding system begins by characterizing the user 410 across a set of demographic dimensions, for example: age, race, gender, income, education level, political views, etc. Next, a profile of the target person 422 with whom the user wants to build greater shared understanding is identified. For example, the target person 422 may be a work colleague from a very different cultural background, an extended family member, or other person. The behavioral empathy and understanding system interfaces the user 410 with the first digital avatar 412 and the second digital avatar 420 that are increasingly more different from the user 410 and increasingly similar to the target person 422 for providing the user 410 with empathy and understanding of the target person 422.

The method 600 may also include characterizing the user across a set of demographic dimensions. The method 600 may further include identifying a profile of another person with whom the user wants to build greater shared understanding. The method 600 may also include receiving, by a discriminator neural network, the user interactions and the responses of the generator neural network to determine whether actions of the generator neural network are realistic. The method 600 may further include providing, by the discriminator neural network, feedback to the generator neural network based on the determination.

This behavioral empathy and understanding approach is useful in any number of circumstances in which humans struggle to understand each other, such as: cross-cultural interactions in diverse organizations (such as Toyota). This approach is also useful in interactions between people of different political beliefs, in which echo chambers and polarization have led people of different groups to believe they have nothing in common with people of other groups. Similarly, this approach is useful for interactions in which one person will make a decision that has an impact on another person, but has no good understanding of the lived experience of the affected person and how the decision may affect the other person.

For example, the California ballot recently had a proposition that would affect gig economy workers; however, although one might desire to make a decision that would help gig workers the most, that someone might honestly not know which decision would be best for gig workers. Messaging from large technology companies suggested that gig workers were in favor of the proposition, but it was difficult to know if this was true or simply propaganda. Moreover, a marketing manager might have difficulty understanding the insights from a large scale marketing survey report. The report provides a very quantitative (dry) numerical summary of the backgrounds and opinions of different market segments. Some aspects of the present disclosure may use the data in these reports to illustrate an average, common, representative, or fringe individual in each market segment as well as the ballot proposition. This illustration allows the marketing manager (or voter) to interact with the digital persona conversationally to gain an understanding of its experiences, perceptions and opinions.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method to generate a digital avatar simulating a human, comprising:
   training a neural network to generate the digital avatar to simulate the human according to a vector of human attributes and generate responses in response to interactions with a user based on the vector of human attributes;
   receiving, from the user, a selected target background and a selected set of attributes of a target person different from the user, including at least a different cultural background, a different gender, and/or different physical features from the user;
   displaying an initial digital avatar having one or more of the selected set of attributes different from the user to provide an initial psychological distance from the user;
   interacting, by the user, with the initial digital avatar until a rapport is detected between the initial digital avatar and the user;
   displaying a next digital avatar having a gradually increased psychological distance from the user and a gradually decreased psychological distance from the target person;
   interfacing the user with the next digital avatar until a rapport is detected between the user and the next digital avatar;
   repeating the displaying and the interacting with the digital avatars until a final digital avatar represents the target person having the selected target background and the selected target set of attributes received from the user; and
   generating a three dimensional (3D) graph comprising the user, the target person, the selected set of attributes, and a progression of the digital avatars displayed to the user.

2. The method of claim 1, in which training comprises:
   receiving, by a generator neural network, the vector of human attributes; and
   generating, by the generator neural network, the responses performed by the digital avatar in response to the interactions with the user based on the vector of human attributes.

3. The method of claim 2, further comprising:
   receiving, by a discriminator neural network, the interactions and the responses of the generator neural network to determine whether actions of the generator neural network are realistic; and
   providing, by the discriminator neural network, feedback to the generator neural network based on the determination.

4. The method of claim 1, further comprising displaying the digital avatar to the user through a virtual reality headset.

5. The method of claim 1, further comprising displaying the digital avatar to the user through a chatbot.

6. The method of claim 1, in which training comprises:
   characterizing the user across a set of demographic dimensions; and
   identifying a profile of another person with whom building a greater shared understanding is desired.

7. The method of claim 1, in which the neural network is trained using a controllable, generative adversarial network (GAN) framework.

8. A non-transitory computer-readable medium having program code recorded thereon to generate a digital avatar simulating a human, the program code being executed by a processor and comprising:
   program code to train a neural network to generate the digital avatar to simulate the human according to a vector of human attributes and generate responses in response to interactions with a user based on the vector of human attributes;
   program code to receive, from the user, a selected target background and a selected set of attributes of a target person different from the user, including at least a different cultural background, a different gender, and/or different physical features from the user;
   program code to display an initial digital avatar having one or more of the selected set of attributes different from the user to provide an initial psychological distance from the user;
   program code to interact, by the user, with the initial digital avatar until a rapport is detected between the initial digital avatar;
   program code to display a next digital avatar having a gradually increased psychological distance from the user and a gradually decreased psychological distance from the target person;
   program code to interface the user with the next digital avatar until a rapport is detected between the user and the next digital avatar;
   program code to repeat the program code to display and the program code to interact with the digital avatars until a final digital avatar represents the target person having the selected target background and the selected target set of attributes received from the user; and
   program code to generate a three dimensional (3D) graph comprising the user, the target person, the selected set of attributes, and a progression of the digital avatars displayed to the user.

9. The non-transitory computer-readable medium of claim 8, in which the program code to train comprises:
   program code to receive, by a generator neural network, the vector of human attributes; and
   program code to generate, by the generator neural network, the responses performed by the digital avatar in response to the interactions with the user based on the vector of human attributes.

10. The non-transitory computer-readable medium of claim 9, further comprising:
    program code to receive, by a discriminator neural network, the interactions and the responses of the generator neural network to determine whether actions of the generator neural network are realistic; and program code to provide, by the discriminator neural network, feedback to the generator neural network based on the determination.

11. The non-transitory computer-readable medium of claim 8, further comprising program code to display the digital avatar to the user through a virtual reality headset.

12. The non-transitory computer-readable medium of claim 8, further comprising program code to display the digital avatar to the user through a chatbot.

13. The non-transitory computer-readable medium of claim 8, in which training comprises:
   program code to characterize the user across a set of demographic dimensions; and
   program code to identify a profile of another person with whom building a greater shared understanding is desired.

14. The non-transitory computer-readable medium of claim 8, in which the neural network is trained using a controllable, generative adversarial network (GAN) framework.

15. A system to generate a digital avatar simulating a human, the system comprising:
   digital avatar training networks to train a neural network to generate the digital avatar to simulate the human according to a vector of human attributes and generate responses in response to interactions with a user based on the vector of human attributes;
   a user interface to receive, from the user, a selected target background and a selected set of attributes of a target person different from the user, including at least a different cultural background, a different gender, and/or different physical features from the user, the neural network to display an initial digital avatar having one or more of the selected set of attributes different from the user to provide an initial psychological distance from the user;
   a digital avatar interaction module to interact, by the user, with the initial digital avatar until a rapport is detected between the initial digital avatar and the user;
   a digital avatar modification module to display a next digital avatar having a gradually increased psychological distance from the user and a gradually decreased psychological distance from the target person, and to interface the user with the next digital avatar until a rapport is detected between the user and the next digital avatar, and to repeat the display and the interaction with the digital avatars until a final digital avatar represents the target person having the selected target background and the selected target set of attributes received from the user; and
   a display to display a three dimensional (3D) graph comprising the user, the target person, the selected set of attributes, and a progression of the digital avatars displayed to the user.

16. The system of claim 15, in which the digital avatar training networks are further configured to receive, by a generator neural network, the vector of human attributes, and to generate, by the generator neural network, the responses performed by the digital avatar in response to the interactions with the user based on the vector of human attributes.

17. The system of claim 15, further comprising a digital avatar display module to display the digital avatar to the user through a virtual reality headset.

18. The system of claim 15, further comprising a digital avatar display module to display the digital avatar to the user through a chatbot.

* * * * *